Jan. 23, 1934.  L. A. PERKINS ET AL  1,944,458

LID FOR MILK CANS OR LIKE

Filed Sept. 19, 1932

INVENTORS  
L.A. Perkins and A.C. Wilson  
BY M. Talbert Dick  
ATTORNEY.

Patented Jan. 23, 1934

1,944,458

UNITED STATES PATENT OFFICE 1,944,458

LID FOR MILK CANS OR LIKE

Lester A. Perkins and Albert C. Wilson, Centerville, Iowa

Application September 19, 1932
Serial No. 633,795

5 Claims. (Cl. 220—55)

This invention relates to a combined handle and locking means for a container lid such as a milk or cream can lid and is an improvement on our application for United States Letters Patent on a Milk can lid retaining means, filed May 28, 1932, and given Serial Number 614,137.

The principal object of our invention is to provide a combined rigid handle construction and lid locking mechanism for the lids of containers such as milk and cream cans that will prevent the accidental removal of the lids from the containers.

A further object of this invention is to provide a milk or cream can lid retaining means that may be instantly and automatically placed in a released position by the hand of the operator lifting the lid from the can.

A still further object of our invention is to provide a means for securing a lid on a milk can that is wholly contained in the top of the lid, does not protrude above the top plane of the lid, and does not interfere with the normal use of the usual rigid handle member found in milk can lids used to facilitate the manipulation of the lid.

Still further objects of this invention are to provide a milk can lid locking means that is easily operated, economical in manufacture, refined in appearance, and durable in use.

These and other objects will be apparent to those skilled in the art.

Our invention consists in the construction, arrangement and combination of the various parts of the device, whereby the objects contemplated are attained as hereinafter more fully set forth, pointed out in our claims and illustrated in the accompanying drawing, in which:

Milk and cream is now shipped almost universally in the usual and well known milk and cream cans. Such containers are excellent for this purpose and only have one objection, i. e., the lids which are wedged into the filling opening of the cans often become accidentally detached, thereby permitting the spilling of the valuable contents. This quite often happens during the handling of the cans and when they are accidentally tipped over, which is comparatively easy due to their upright construction. We have overcome such undesirable losses as will hereinafter be understood.

Figure 2:
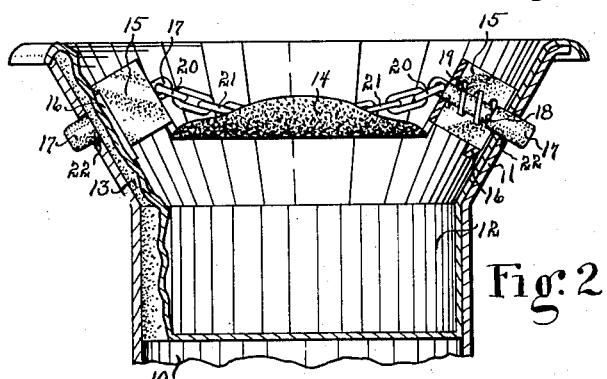
Fig. 2 is a side sectional view of the milk can lid and upper portion of a milk or cream can, showing our means of securely holding the lid against accidental detachment from the can.

Referring to the drawing, we have used the numeral 10 to designate the usual filling neck portion of a milk or cream can now being used by the general public. The numeral 11 designates the usual upwardly and outwardly flared portion integrally formed on the upper portion of the neck portion 10. The filling opening of the can is capable of being closed by the usual lid having the plug portion 12 and the upwardly and outwardly flared portion 13. The portion 12 is designed to frictionally engage in the neck 10 of the can and the flared portion to rest in and adjacent the flared portion 11, as shown in Fig. 2. Such lids are of hollow construction and it is inside such lids that we install our mechanism and which we will now describe.

Figure 1:
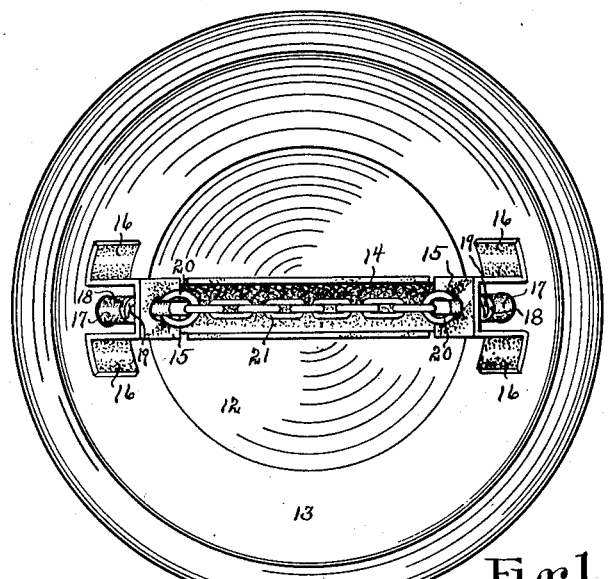
Fig. 1 is a top plan view of our milk can lid ready for use.

When our retaining means is installed by the factory at the time the milk can lid is manufactured, we recommend the dispensing of the ordinary rigid handle and the substitution of our specially designed rigid handle member, as shown in Fig. 1 and Fig. 2. The central or hand-hold portion of this special handle member is designated by the numeral 14 and is of circular trough construction. In order that this portion 14 will better fit the hand of the operator, we cause the curved side walls to extend upwardly a substantial distance near the central portion of this portion of the handle member, as shown in Fig. 2. Integrally formed on each end of the portion 14 is a U-member 15 having bent feet members 16, as shown in Fig. 1. These feet members 16 are bent to conform with the inside of the flared portion 13 of the lid and these two pairs of feet members are secured by suitable means such as soldering, spot welding, or riveting to the inside of the flared portion 13 at points diametrically opposite from each other, as shown in Fig. 1.

When this construction of a rigid handle member is used the portion 14, portions 15, and feet members 16 may be stamped and formed out of a single sheet of metal. The upper portions of the two U-members 15 extend upwardly and outwardly from the bottom portion of the handle portion 14 and each conforms to the general plane of that portion of the lid to which it is secured, as shown in Fig. 2. The two U-members 15 form an important part of means for locking the lid to its container and may each be considered as an inverted cup or cage member. The numeral 17 designates a plunger slidably mounted in each of the U-members 15. These plungers 17 extend completely through the U-members in which they are slidably mounted and also have their lower ends extending through and a substantial distance beyond the flared portion 13, as shown in Fig. 2. The numeral 18 designates a shoulder on each of the plungers, as shown in the drawing. The numeral 19 designates a coil spring embracing each of the plungers and inside the U-members. These coil springs each have one of their ends engaging the top of the U-member in which they reside and their other end engaging the shoulder 18 of the plunger they embrace.

By this construction the plungers 17 will be yieldingly held to their lower sliding movement. The plungers are each stopped in their downward sliding movement by a link 20 linked in their upper ends and engaging the outside top of the U-members, as shown in the drawing. The numeral 21 designates a length of chain or like connecting the two links 20. The length of this chain should not be excessive, but it should be of sufficient length to permit the downward effective sliding movement of the plungers 17. As the upper portions of the U-members extend upwardly and outwardly from the curved trough portion 14 of the handle member, the position of the chain 21 will be directly above and longitudinally of the portion 14.

By this arrangement of parts, the chain 21 may normally rest within the trough portion 14 of the handle where it is out of the way and cannot possibly interfere with the normal use of the rigid handle portion of the lid. On the other hand, when it is desired to pull upwardly on the chain 21 to release the lid from its container, the chain may be easily and quickly found by the hand of the operator.

The numeral 22 designates two holes in the flared portion 11 of the can. These two holes are diametrically positioned from each other and are designed to register with the lower end portions of the two plunger members 17 respectively when the lid is in a closed position on the can.

From the foregoing, it will readily be seen that to secure a lid to a milk can it is merely necessary to force the lid in and on the can until the lower ends of the two plungers enter and engage the two holes 22 respectively. These two plungers will be yieldingly held in a lowered engaging position by their springs and as long as they so remain it will be impossible to remove the lid. To release the lid for the purpose of removal it is merely necessary to reach inside the portion 14, grasp the chain 21, and raise it upwardly. This action raises the catching plungers 17 against their springs until they are free of engagement with the holes 22. Further upward pulling of the chain will naturally lift the lid from the filling opening of the can. It is therefore apparent that the lid may be removed quickly from its container merely by lifting upwardly on the chain 21, which will not only remove the lid, but will automatically release our retaining means. The raised sides of the portion 14 of the handle aid in assuring the position of the chain 21 inside the portion 14 when not in use. Although our lid locking means is highly efficient it is also neat, compact, and durable.

Figure 3:
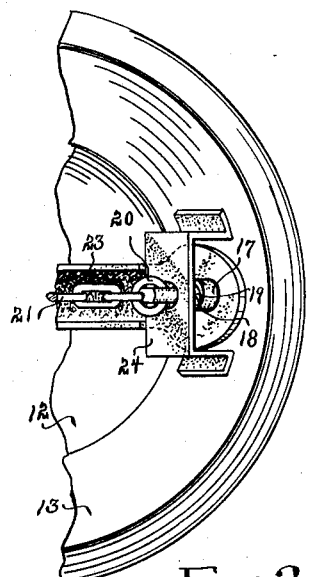
Fig. 3 is a top plan view of a section of a standard milk can lid showing our method of adapting our device to standard milk can lids already manufactured.
Figure 4:
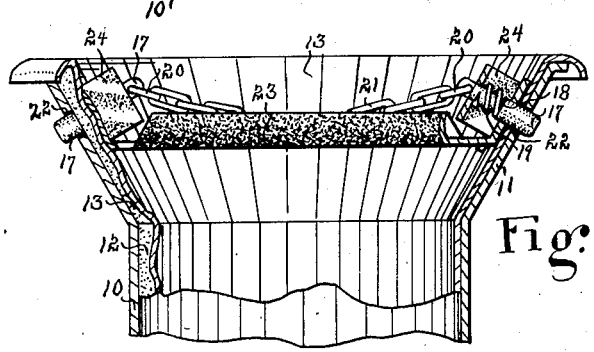
Fig. 4 is a side sectional view of a milk can lid and milk can and more fully illustrates the modified construction shown in Fig. 3.

In Fig. 3 and Fig. 4 we show a milk can lid having the standard type rigid handle member. We have designated this handle member by the numeral 23. Such standard handle members 23 are of trough construction and are directly connected at their two ends by suitable means to the inside of the flared portion 13. Naturally, such handle members do not have the U-members 15 available and therefore it is necessary, when installing our device on lids already manufactured, to provide individual U-members 24, as shown in Fig. 3 and Fig. 4. One of these U-members 24 is placed over each end portion of the handle member 23 that is secured to the lid portion 13. These U-members 24 are secured to the lid in the same manner as the U-members 15 and naturally serve the same purpose. The remaining similar parts found in Fig. 3 and Fig. 4 are the same as those used in describing the construction shown in Fig. 1 and Fig. 2.

Some changes may be made in the construction and arrangement of our improved lid for milk cans or like without departing from the real spirit and purpose of our invention, and it is our intention to cover by our claims any modified forms of structure or use of mechanical equivalents which may be reasonably included within their scope.

We claim:

1. In combination with a milk can having two holes in the side of its filling opening and a lid therefor, a one-piece handle member comprising a central trough portion and an inverted U-member at each end; said inverted U-members being secured to said milk can lid, a plunger slidably mounted in each of said inverted U-members capable of entering and engaging said two holes respectively in said milk can when said lid is on said can, a coil spring for yieldingly holding each of said plungers in engagement with said holes, and a chain normally resting in the central trough portion of said handle member having its two ends connected to said plungers respectively for facilitating the manual movement of said plungers out of engagement with said holes and against the action of said coil springs.

2. In combination with a can having two holes and a lid therefor, a one-piece handle member comprising a central trough portion and a footed inverted U-member at each end thereof; the feet of each of said U-members being secured to the said lid, a plunger slidably mounted in each of said inverted U-members capable of entering and engaging said two holes respectively in said can when said lid is on said can, a shoulder on each of said plungers, a coil spring embracing each of said plungers having one end engaging the shoulder of the plunger which it embraces and its other end engaging the under side of the U-member in which the plunger is slidably mounted, and a flexible element normally resting in the trough portion of said handle member having its two ends connected to said plungers respectively for facilitating the manual movement of said plungers out of engagement with said holes and against the action of said coil springs.

3. In combination with a can having two holes and a lid therefor, a one-piece rigid handle member comprising a central portion and an inverted U-member on each end thereof; said U-members each being secured to said lid, a plunger slidably mounted in each of said inverted U-members capable of moving into engagement with said two holes respectively in said can when said lid is on said can, a means for yieldingly holding said plungers in engagement with said holes, and a chain having its two ends connected to said plungers respectively for facilitating the manual movement of said plungers out of engagement with said holes at times.

4. In combination with a container and lid therefor, a rigid horizontal handle member of trough construction secured to said lid, a catch member on said lid having its upper end extending to a point above one end of said handle member, a second catch member on said lid having its upper end extending to a point above the other end of said handle member; said two catch members capable of engaging said container for preventing the accidental removal of said lid when said lid is in a closed position on said container, and a chain extending longitudinally above said handle member having its two ends connected to the upper end of each of the two catch members respectively for facilitating the manual operation of the catch members at times; said chain normally resting in the trough portion of said handle member when not being used.

5. In combination with a milk can having two holes in the side of its filling opening and a lid therefor, a bracket element on said lid, a second bracket member on said lid and positioned diametrically opposite from said first mentioned bracket member, a plunger slidably mounted in each of said bracket members extending upwardly and inwardly and capable of entering and engaging said two holes respectively in said milk can when said lid is on said can, a spring for yieldingly holding each of said plungers in engagement with said holes, and a flexible element having its two ends connected to the two plungers respectively for facilitating the manual movement of said plungers out of engagement with said holes and for serving as a handle for lifting said lid from said can after said plungers are out of engagement with the said holes in the filling opening of said milk can.

LESTER A. PERKINS.
ALBERT C. WILSON.